United States Patent [19]
Morgan

[11] Patent Number: 5,530,627
[45] Date of Patent: Jun. 25, 1996

[54] ELECTRONIC FLASH HEAD AND ACCESSORIES

[76] Inventor: John J. Morgan, 380 Hunt River Way, Suwanee, Ga. 30174

[21] Appl. No.: 357,114

[22] Filed: Dec. 16, 1994

[51] Int. Cl.$^6$ ................................................ G03B 15/02
[52] U.S. Cl. .............................. 362/12; 362/16; 362/427; 362/436
[58] Field of Search ..................................... 362/3, 11, 12, 362/15, 16, 18, 247, 249, 250, 427, 436, 438

[56] References Cited

U.S. PATENT DOCUMENTS

| | | | |
|---|---|---|---|
| 2,097,303 | 10/1937 | Pirani | 362/3 |
| 2,557,532 | 6/1951 | Chaft | 362/11 |
| 3,462,591 | 8/1969 | Pichard | 362/18 |
| 4,594,645 | 6/1986 | Terashita | 362/18 |
| 5,161,871 | 11/1992 | Baliozian | 362/18 |

Primary Examiner—Denise L. Gromada
Assistant Examiner—Sara Sachie Raab
Attorney, Agent, or Firm—James B. Middleton

[57] ABSTRACT

An electronic flash head for photographic lighting, or a "strobe head", contains a miniaturized circuit that is potted to protect and electrically insulate the components. The flash head is small, and has a socket so the flash tube can be replaced to take different amounts of power input. A clamp quickly fastens to the body of the flash head for connection of any desired reflector, soft box or other accessory. A tail extends from the flash head, the tail being of a size to fit into a light socket for support; and, a threaded socket in the tail allows connection of many different supporting devices to the head. The one flash head can therefore be used in almost any photographic lighting situation through selection of the support, the reflector and the flash tube.

11 Claims, 2 Drawing Sheets

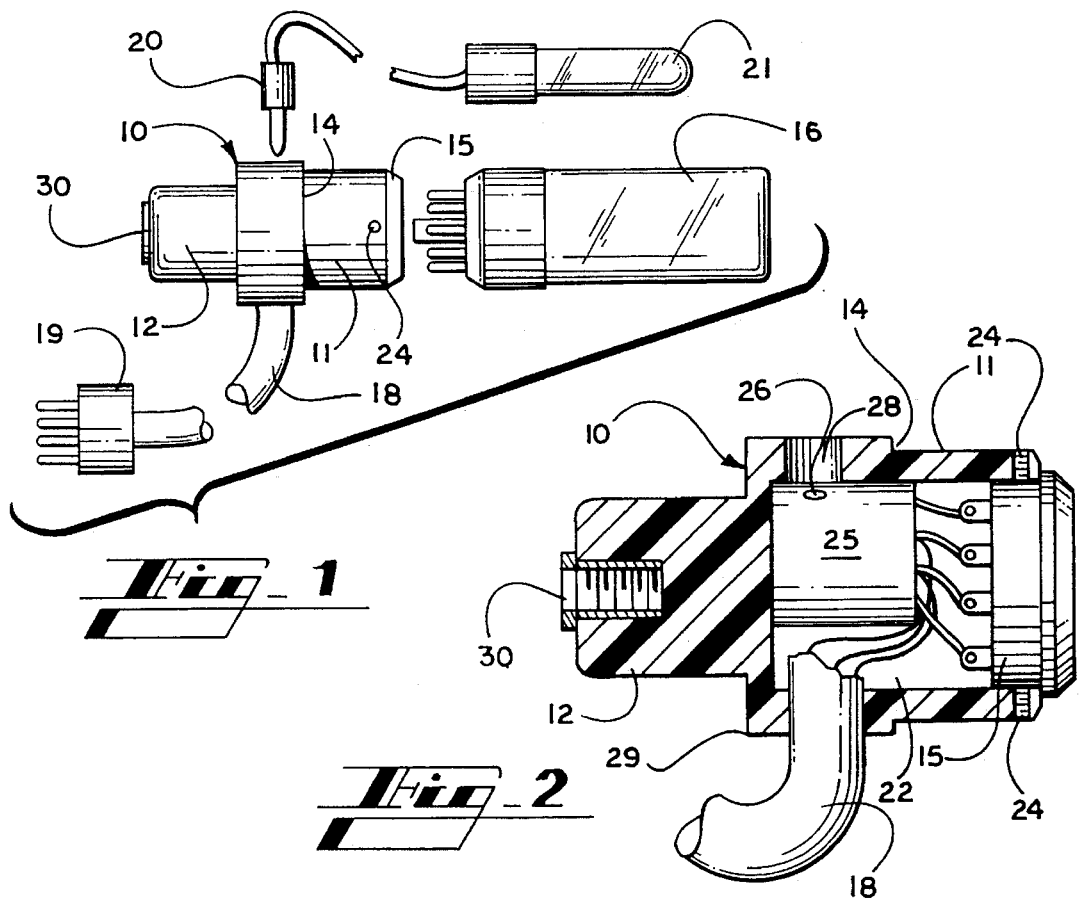
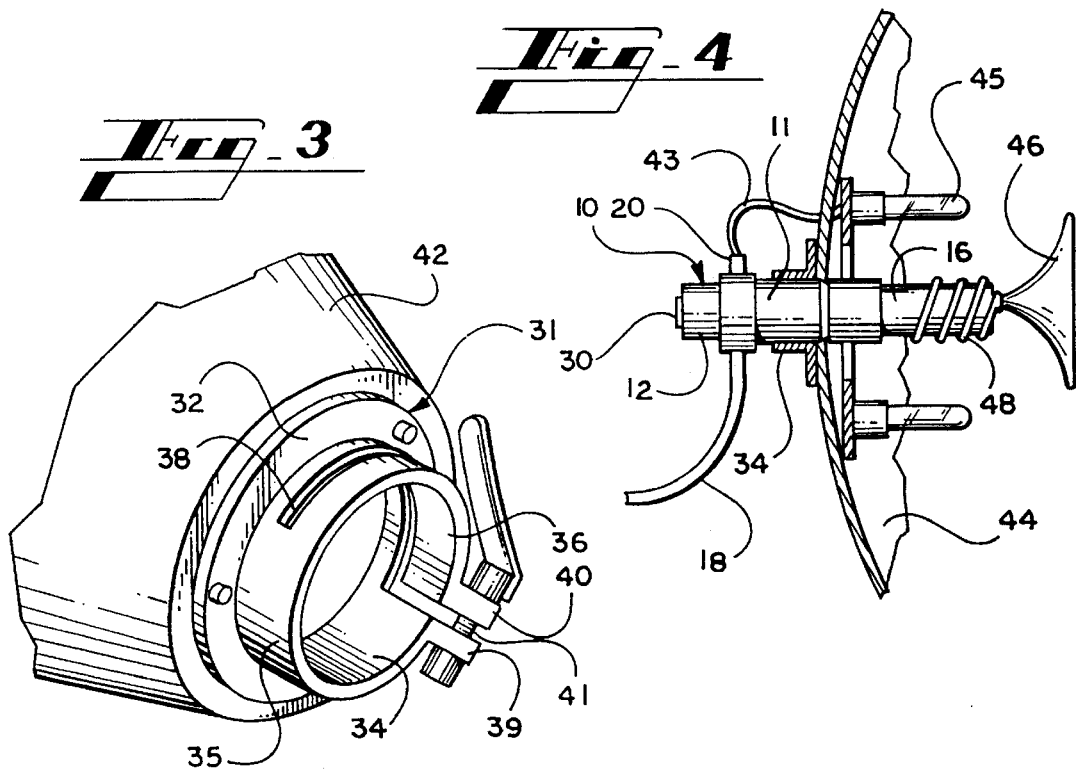

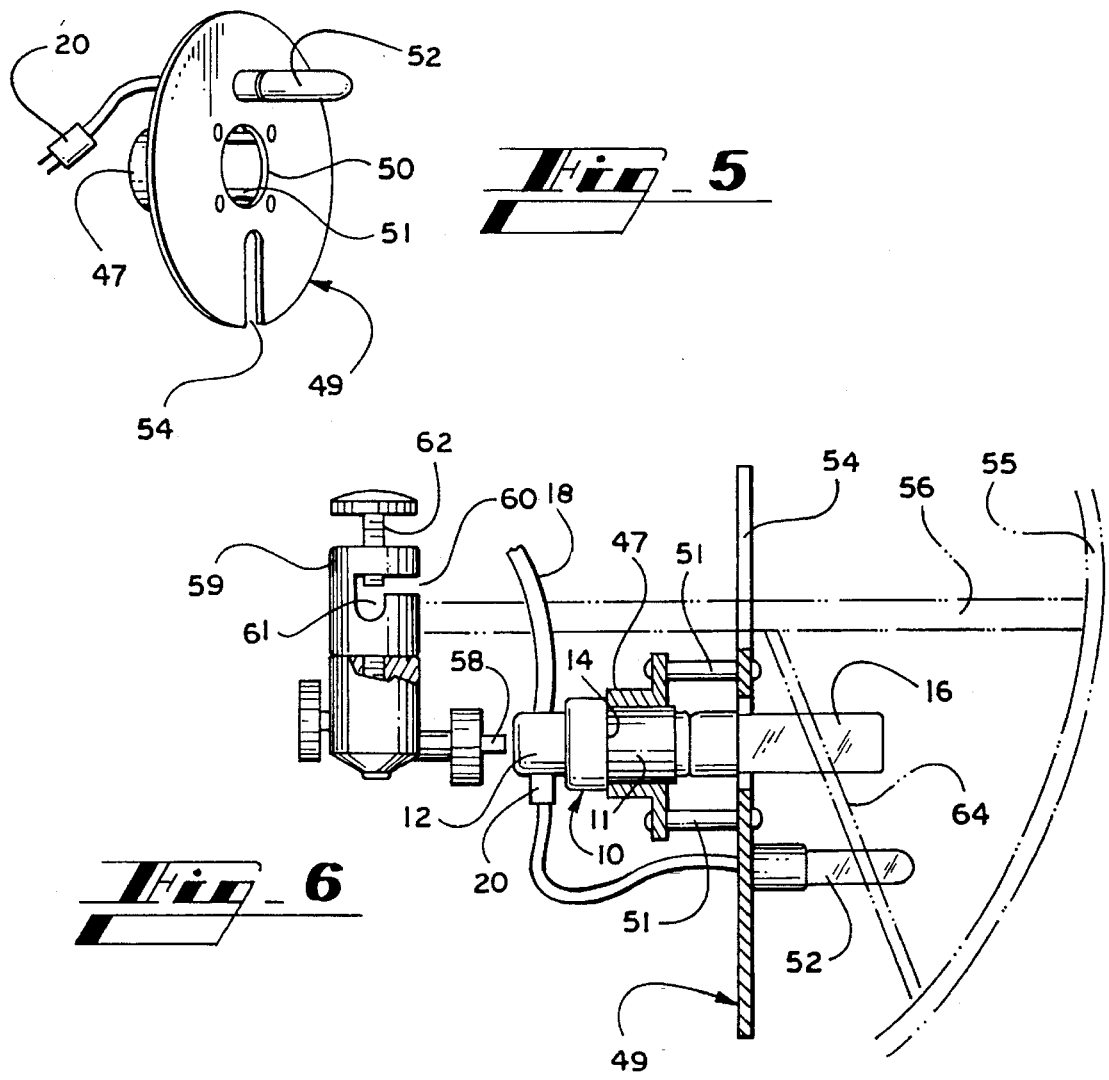
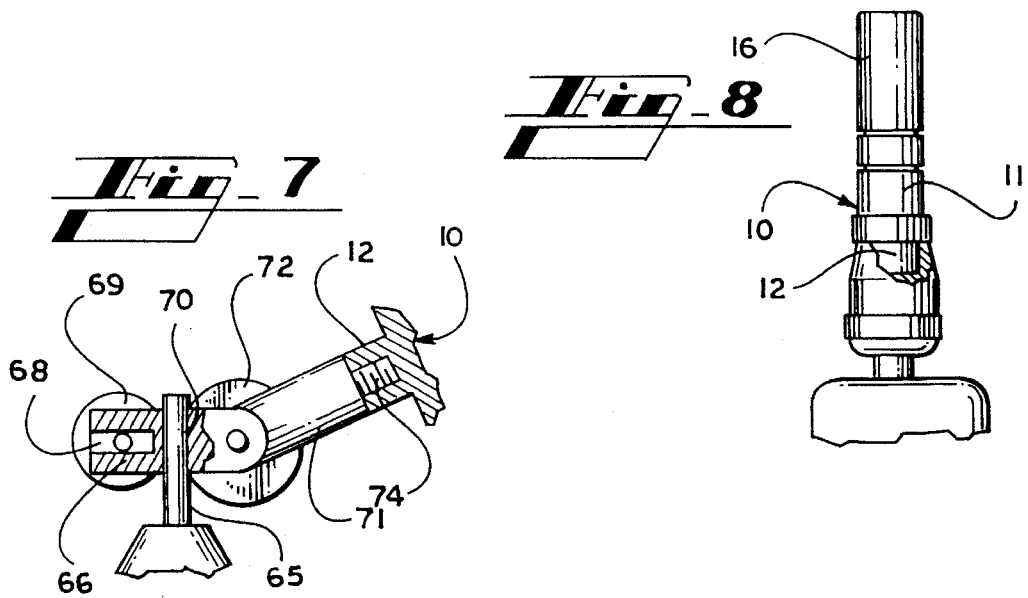

ELECTRONIC FLASH HEAD AND ACCESSORIES

BACKGROUND OF THE INVENTION

1. Field of the Invention

This invention relates generally to electronic flash units for use in photography, and is more particularly concerned with a small and light-weight flash head that is easily adapted to a wide variety of lighting applications.

2. Discussion of the Prior Art

Electronic flash units for use in flash photography are well developed and widely used. There are small units built into cameras, and there are small units to be mounted on, or used with, cameras. These small units have commensurately small light output, and are used mostly by amateur photographers and "snapshot" photographers. There are larger flash units designed to be portable, but having sufficient light output for professional photographers in fields such as wedding photography, news photography and the like. Such units are quite large and rather unwieldy, but provide the needed light in a portable package.

For the photographer who sets up elaborate lighting systems, whether in the studio or on location, the current electronic flash unit comprises a relatively large metal housing having a built-in electronic flash head, and a flash tube with a predetermined light pattern. Since most lights have a dedicated application, the photographer must have a variety of lights, one or more for each lighting situation. This means that a photographer setting up on location must bring with him each type of light head required. In general, no light can be substituted for another because the light quality or pattern is fixed, and the housings for the lights are fixed. It will be understood that the relatively large housing for the electronic flash unit has been necessary because of the high voltages required to operate the light; and, heavy metal has been used to protect the tube and the electronic circuitry.

SUMMARY OF THE INVENTION

The present invention provides a head for an electronic flash, the head having a cord to be plugged into any conventional power pack. The head includes a socket for receiving a flash tube, so tubes of widely varying power ratings can be easily plugged into the head. The head includes a body adapted to be received in a novel clamping member, the clamping member being adapted for attachment to virtually any reflector, soft box, umbrella, or other lighting means, so the head of the present invention can be easily adapted to many lighting situations. In the preferred embodiment of the invention, the head also includes a tail member receivable within a socket for vertically supporting the head wherever desired. Furthermore, the tail member may include a threaded member for attaching the head to a light stand or other mounting accessories.

BRIEF DESCRIPTION OF THE DRAWINGS

These and other features and advantages of the present invention will become apparent from consideration of the following specification when taken in conjunction with the accompanying drawings in which:

FIG. 1 is a side elevational view of an electronic flash head made in accordance with the present invention, and showing a flash tube and modeling light exploded therefrom;

FIG. 2 is an enlarged, diametrical cross-sectional view of the head shown in FIG. 1;

FIG. 3 is a perspective view showing a head clamping member made in accordance with the present invention;

FIG. 4 is a cross-sectional view illustrating the head of FIG. 1 mounted on a reflector;

FIG. 5 is a perspective view showing a flat reflector for use with the head of the present invention;

FIG. 6 is a side elevational view showing the head of the present invention with the flat reflector of FIG. 5, and mounting means;

FIG. 7 is a side elevational view, partially in cross-section, of a mounting means for the head of the present invention; and, FIG. 8 is a fragmentary side elevational view showing the head of the present invention held in a conventional lamp socket.

DETAILED DESCRIPTION OF THE INVENTION

Referring now more particularly to the drawings, and to those embodiments of the invention here chosen by way of illustration, FIG. 1 shows an electronic flash head 10 made in accordance with the present invention. The head 10 includes a body 11 and a tail 12 extending from the body 11. It will be noticed that the body 11 defines a shoulder 14 which will be discussed hereinafter. The body 11 has a socket 15 for receiving a conventional flash tube 16.

It will be understood that an electronic flash unit is illustration, FIG. 1 shows an electronic flash head 10 made in referred to in the vernacular as a "strobe". The better terminology is an electronic flash, but the meaning is the same. Thus, the present invention provides a flash head, or "strobe head" and those skilled in the art will understand that the meaning is the same.

A cord 18 extends from the flash head 10, the cord 18 terminating in a plug 19. As will be discussed more fully hereinafter, the plug 19 will be a standard plug to fit a particular power pack. Diametrically opposite from the cord 18, there is a socket to receive the plug 20 of the modeling light 21. Modeling lights have a standard plug 20, so the female socket of the flash head 10 will be adapted to receive this standard plug.

Attention is directed to FIG. 2 of the drawings for a better understanding of the construction of the flash head 10. The flash head 10 is here shown as formed of a polymeric material, and those skilled in the art will realize that any of numerous specific materials will serve well. One successful embodiment has been made of DuPont "Delrin" which is an acetal resin, or a polyoxymethylene. Other resins will suggest themselves to the person skilled in the art. The important features are that the material is a dielectric, and the material has good dimensional stability. Again, numerous materials, easily meet these criteria.

The body 11 defines an opening 22 therein, the socket 15 being received within the open end of the opening 22. Since the socket 15 is a standard item, the opening 22 will have a diameter to match the diameter of the socket 15. The socket 15 is held within the opening 22 by a plurality of set screws 24.

One of the important features of the present invention is the fact that the control circuit for the flash tube 16 is miniaturized and placed within the opening 22 of the flash head 10. The circuit itself is standard, the circuit being designed to match the particular power pack being used. The only novelty is in the use of small components, and then encapsulating, or potting, the entire assembly to prevent arcing, or shorting, of the high voltage in the small space allotted. Thus, FIG. 2 illustrates the circuit designated at 25. For compactness, the socket 26 to receive the plug 20 is molded integrally with the circuit 25.

It will be understood that wires from the circuit 25 are connected to the socket 15; and, the main power cord and switch line are contained in the cord 18. To accommodate these physically, the circuit 25 is generally cylindrical, but is cut along a secant to leave a space for the incoming cord 18. Thus, the body 10 can be formed with the cylindrical opening 22, with an aperture 28 for access to the socket 26, and with an aperture 29 for the cord 18. The circuit 25 is then placed into the opening 22, properly oriented as shown, the circuit 25 being preferably held in place by an adhesive or the like. Wires are connected to the socket 15, and the assembly is complete.

Those skilled in the art will realize that there are few variations in the actual electrical circuit in the potted circuit 25, and there is a fairly wide variation in the plug 19. Thus, the circuits 25 will be prepared in each of the variations of circuits; then, the required plug 19 will be attached to the cord 18. All other aspects of the device are standard for all units.

As is mentioned briefly above, the flash head 10 includes a tail 12 extending from the body 11. The tail 12 can be thought of as an alternative mounting means. First, the tail itself can be inserted into a socket to hold the flash head vertically. Though any hollow may act as a socket, in the preferred embodiment of the invention the tail 12 is dimensioned to be easily received by a standard light socket as shown in FIG. 8 of the drawings. It will be recognized that photographers frequently need to show a lamp, and have the lamp appear to be illuminated. By placing a flash head in the place of the usual light bulb, the lamp can be shown as desired.

In addition to the tail itself as a mounting means, there is a threaded socket 30. It is contemplated that the socket 30 will have the same standard thread (¼–20) as a standard tripod, or tripod mount for a camera or the like. Since this thread is commonly used in photographic equipment, such a thread will be useful with numerous pieces of equipment. Some further discussion of the socket 30 as a mounting means will be found below.

FIG. 3 of the drawings shows a clamping member for use with the flash head shown in FIGS. 1 and 2. Those skilled in the art will realize that other clamps may be used successfully, but the clamp of FIG. 3 is very simple and convenient to use with the flash head 10. The clamping member is generally designated at 31 and includes a mounting flange 32 supporting a collar 34. The collar 34 comprises a fixed portion 35 which is integral with the mounting flange 32, and a movable portion 36 which is separated from the mounting flange 32 by a circumferentially extending slot 38. There is a pair of tabs 39 and 40, the tab 39 being on the portion 35 and the tab 40 being on the portion 36. A screw 41 passes through the tabs 39 and 40 for urging the tabs together. It is contemplated that the inside diameter of the collar 34 will be only very slightly larger than the outside diameter of the body 11 of the flash head 10, so only a slight movement of the movable portion 36 will be required to clamp firmly to the body 11. Also, the thread on the screw 41 will be such that a small rotation will accomplish the necessary tightening of the collar.

The mounting flange 32 of the clamping member 31 is shown in FIG. 3 attached to a reflector 42. It must be understood that the reflector 42 is by way of illustration only, and the flange 32 may be mounted on almost any reflector or other light mounting means. For example, the reflector 42 may be a bullet shaped reflector for use as a spot lamp, may be a very wide pan reflector, or may be any shape in between. Also, the flange 32 may be fixed to a "quick ring" for mounting a flash head in a soft box. Furthermore, in view of the size and weight of the flash head of the present invention, a plurality of the mounting means 31 may be fixed to a single quick ring to increase the light in the soft box.

FIG. 4 of the drawings shows the flash head 10 with one conventional light set-up. It will be noticed that the body 11 receives the collar 34 of the clamping member shown in FIG. 3. The clamping member is here shown as fixed to a reflector 44, the reflector having a plurality of modeling lights 45 mounted therein. A cord 43 from the modeling lights 45 is fixed in the plug 20 to power the modeling lights. No specific support is shown for the light in FIG. 4, but it will be understood that the reflector 44 may be supported, or the tail 12 of the flash head 10 may be fixed to a support means.

Since the flash tube 16 is usually an unbaffled light source, there may sometimes be a spot of light on the subject that is too bright for the desired effect. The solution to the problem is the provide a diffuser, or a baffle, to avoid the bright spot. One simple baffle is shown in FIG. 4. A horn-shaped baffle 46 has a coiled spring 48 fixed to its apex. The spring 48 is of a diameter to be received somewhat snugly over the flash tube 16. Thus, the spring 48 supports the baffle 46, and light directly from the tube 16 is deflected by the baffle 46 to the reflector 44. Again, it should be remembered that the reflector 44 is shown by way of illustration only, and virtually any shape of reflector may be substituted for that shown.

Looking at FIGS. 5 and 6 of the drawings, a simple, flat reflector is shown. This reflector 49 includes a clamping member 47 substantially like the clamp shown in FIG. 3. The reflector 49 defines a central opening 50 for receiving the flash tube therethrough. It will be seen that the reflector 49 is spaced from the clamping member 47 by a plurality of spacers 51, so air can circulate around the device for cooling.

The reflector 49 may include one or more modeling lights 52, powered through the plug 20 as discussed previously. A radial slot 54 in the reflector 49 will receive the shaft of an umbrella when the reflector is used with an umbrella. This arrangement is shown in FIG. 6 of the drawings.

In FIG. 6 of the drawings the reflector 49 is shown on a flash head 10, and with a flash tube 16 in place. An umbrella 55 is shown in phantom, and it will be seen that the shaft 56 passes through the slot 54 in the reflector 49.

To support the flash head, a screw 58 is threaded into the socket 30 in the tail 12. As here shown, the screw 58 is mounted on a universal joint to give complete flexibility in placement of the light. The link member having the universal joint is supported by a shaft clamp 59. It will be recognized that the shaft clamp 59 is not in its normal position in order to show its construction, but the shaft 56 of the umbrella 55 will pass through the slot 60 and into the clamp 61, where it can be fixed by means of the screw 62. The flash head and reflector are of sufficiently light weight that the entire assembly will be supported by the shaft of the umbrella 55. Thus, the end of the umbrella shaft will be supported by conventional clamps or the like. Because of this fact, the flash tube 16 can be placed anywhere along the shaft 55, and can be placed so far up that the tube 16 extends between the ribs 64 of the umbrella 55.

The light weight of the flash head of the present invention allows; other simple mounting means, one of which is shown in FIG. 7 of the drawings. FIG. 7 shows a conventional light stand having a pin 65. A first link 66 defines holes therein to receive the pin 65. One hole 68 extends axially from the end of the link, and a knob 69 tightens a screw to hold the link in place. A second hole 70 extends diametrically of the link, and has a similar knob which is broken away in FIG. 7.

A second link 71 is pivotally fixed to the first link 66, the pivot being selectively fixed by knob 72. This second link 71 has a screw 74 to be received in the socket 30 of the tail 12 on the flash head 10.

From the above description it will be understood that the mounting arrangement shown in FIG. 7 can be placed on a light stand using the hole 68, and the flash head 10 will be directed vertically, and movable to the side by pivoting the second link 71 with respect to the first link 66. Alternatively, the hole 70 can receive the pin 65 of the light stand, and the flash head 10 will be directed horizontally, and movable up or down by pivoting the second link 71 with respect to the first link 66.

Many other mounting arrangements are possible using the tail 12 and the socket 30. While the links shown in FIG. 7 illustrate some possibilities, one may also use a conventional spring wire clamp having a screw to be received by the socket 30 so the flash head can be clamped virtually anywhere. Other mounting arrangements will suggest themselves to those skilled in the art.

It will now be understood that the present invention provides a light weight electronic flash head that is readily adaptable to almost any lighting requirement. The single head can be readily inserted into any reflector, soft box or other lighting arrangement, so one is not limited in the use of reflectors. The flash tube 16 can be readily changed, so one flash head can be used to deliver different amounts of power. Further, it will be recognized that the tube 16 as pictured is a glass envelope that covers the actual flash tube, and this envelope can be changed to substitute a colored envelope if desired. The various mounting means for the flash head 10 allow use of the flash head in almost any situation; and, the fact that all flash heads are alike will allow ready substitution in the event an important light fails.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. An electronic flash head for photographic lighting, said flash head comprising a body formed of a dielectric material, said body defining a central opening therein, a socket for selectively receiving a flash tube, said socket being received by said central opening for closing said opening, a flash circuit, said flash circuit comprising an encapsulated electronic circuit of a size to be received within said central opening of said body, circuit means within said central opening electrically connecting said flash circuit to said socket, a cord extending from said body and electrically connected to said flash circuit, and mounting means for said flash head, said mounting means comprising one end of said body.

2. A flash head as claimed in claim 1, said flash circuit further including a modeling light socket, said body defining an aperture located so a modeling light plug can be inserted into said modeling light socket.

3. A flash head as claimed in claim 1, and further including a tail extending from said body for use as an alternative mounting means, said tail being sized to be received within a lamp socket for supporting said flash head.

4. A flash head as claimed in claim 3, wherein said tail further includes a threaded socket for receiving a threaded screw to support said flash head.

5. A flash head as claimed in claim 4, and further including a first link receivable on a stand, a second link pivoted to said first link, a threaded screw extending from said second link, said threaded socket receiving said threaded screw for supporting said flash head.

6. A flash head as claimed in claim 1, and a shoulder extending circumferentially of said body.

7. A flash head as claimed in claim 6, and further including a clamping member receivable over said one end of said body, said clamping member comprising a cylindrical collar, and a flange around said collar, said collar including a stationary portion fixed with respect to said flange, and a movable portion movable with respect to said flange, and means for urging said movable portion towards and away from said body.

8. A flash head as claimed in claim 7, and further including a light reflector, said flange being fixed to said light reflector so that said flash tube will be disposed within said light reflector when said body is received within said clamping means.

9. A flash head as claimed in claim 6, and further including a tail extending from said body for use as an alternative mounting means, said tail including a threaded socket for receiving a threaded screw to support said flash head, and a flat reflector defining a hole therein for receiving said flash tube therethrough, and a link having a threaded screw receivable by said threaded socket for supporting said light head.

10. A flash head as claimed in claim 9, and further including an umbrella having a shank, said link being fixed to said shank of said umbrella.

11. An electronic flash head for photographic lighting, said flash head comprising a body, mounting means for said body extending from one end of said body, a socket carried by said body for selectively receiving a flash tube, a flash circuit within said flash head, circuit means electrically connecting said flash circuit to said socket, and a cord extending from said body and electrically connected to said flash circuit, wherein said body defines a central opening, said flash circuit comprising an encapsulated electronic circuit of a size to be received within said central opening of said body, and said socket being mounted to close said central opening, said flash circuit further including a modeling light socket, said body defining an aperture located so a modeling light plug can be inserted into said modeling light socket, wherein said central opening is cylindrical, said flash circuit is cylindrical and cut along a secant for defining a space between said flash circuit and a wall of said central opening, said cord extending into said space.

* * * * *